(12) United States Patent
Nishiyama et al.

(10) Patent No.: US 9,612,008 B2
(45) Date of Patent: Apr. 4, 2017

(54) AUSTENITIC STAINLESS STEEL TUBE

(75) Inventors: Yoshitaka Nishiyama, Nishinomiya (JP); Mitsuharu Yonemura, Takarazuka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 289 days.

(21) Appl. No.: 14/129,335

(22) PCT Filed: May 28, 2012

(86) PCT No.: PCT/JP2012/063590
§ 371 (c)(1),
(2), (4) Date: Dec. 26, 2013

(87) PCT Pub. No.: WO2013/001956
PCT Pub. Date: Jan. 3, 2013

(65) Prior Publication Data
US 2014/0150734 A1  Jun. 5, 2014

(30) Foreign Application Priority Data
Jun. 28, 2011 (JP) ................................ 2011-142544

(51) Int. Cl.
| | | |
|---|---|---|
| C22C 38/40 | (2006.01) | |
| F22B 37/10 | (2006.01) | |
| C21D 6/00 | (2006.01) | |
| C21D 9/14 | (2006.01) | |
| C22C 38/00 | (2006.01) | |
| C22C 38/02 | (2006.01) | |
| C22C 38/04 | (2006.01) | |
| C22C 38/48 | (2006.01) | |
| F16L 9/02 | (2006.01) | |
| C22C 38/06 | (2006.01) | |
| C22C 38/42 | (2006.01) | |
| C22C 38/44 | (2006.01) | |
| C22C 38/46 | (2006.01) | |
| C22C 38/50 | (2006.01) | |
| C22C 38/54 | (2006.01) | |
| C22C 38/58 | (2006.01) | |
| C21D 7/06 | (2006.01) | |

(52) U.S. Cl.
CPC .............. *F22B 37/10* (2013.01); *C21D 6/004* (2013.01); *C21D 9/14* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *F16L 9/02* (2013.01); *C21D 7/06* (2013.01)

(58) Field of Classification Search
CPC .. C21D 9/14; C21D 7/06; C21D 6/004; C22C 38/002; C22C 38/001
USPC .......................................................... 148/325
See application file for complete search history.

(56) References Cited

U.S. PATENT DOCUMENTS

| | | | |
|---|---|---|---|
| 4,086,104 A | 4/1978 | Kinoshita et al. | |
| 4,379,745 A | 4/1983 | Polizzotti et al. | |
| 7,377,989 B2 * | 5/2008 | Matsuo | C22C 38/18 148/325 |
| 8,852,362 B2 * | 10/2014 | Nishiyama | B21C 37/06 148/325 |
| 2006/0057414 A1 | 3/2006 | Matsuo | |

FOREIGN PATENT DOCUMENTS

| | | |
|---|---|---|
| CN | 1519388 | 8/2004 |
| EP | 2 060 461 | 5/2009 |
| JP | 49-135822 | 12/1974 |
| JP | 52-8930 | 1/1977 |
| JP | 53-114722 | 10/1978 |
| JP | 54-122624 | 9/1979 |
| JP | 54-138814 | 10/1979 |
| JP | 55-58329 | 5/1980 |
| JP | 57-92130 | 6/1982 |
| JP | 58-39733 | 3/1983 |
| JP | 58-133352 | 8/1983 |
| JP | 62-224627 | 10/1987 |
| JP | 63-54598 | 3/1988 |
| JP | 6-322489 | 11/1994 |
| JP | 9-249946 | 9/1997 |
| JP | 10-277692 | 10/1998 |
| JP | 2002-285236 | 10/2002 |
| JP | 2004-132437 | 4/2004 |
| JP | 2004-339576 | 12/2004 |
| JP | 2004-359991 | 12/2004 |

(Continued)

OTHER PUBLICATIONS

NPL: ASTM table E112-96 (2004).*

*Primary Examiner* — Jie Yang
(74) *Attorney, Agent, or Firm* — Clark & Brody

(57) ABSTRACT

There is provided an austenitic stainless steel tube containing, by mass percent, 14 to 28% of Cr and 6 to 30% of Ni, wherein the steel tube has a metal micro-structure, in which an average dislocation density, which is determined by XRD measurement using a Co tube, is $3.0 \times 10^{14}/m^2$ or higher, on the inner surface side of the steel tube. The crystal grain size of the steel tube is preferably 50 μm or smaller. The steel tube of the present invention is suitable as a steel tube used in power-generating plants.

3 Claims, No Drawings

(56) References Cited

FOREIGN PATENT DOCUMENTS

| | | |
|---|---|---|
| JP | 2006-307313 | 11/2006 |
| JP | 2009-68079 | 4/2009 |
| RU | 2 273 679 | 4/2006 |
| RU | 2 293 788 | 2/2007 |
| RU | 2 420 598 | 6/2011 |
| WO | 2008/023410 | 2/2008 |

* cited by examiner

AUSTENITIC STAINLESS STEEL TUBE

TECHNICAL FIELD

The present invention relates to an austenitic stainless steel tube excellent in corrosion resistance and, more particularly, to an austenitic stainless steel tube for power-generating plants, which is suitable as a starting material used for boilers, pipes, various types of heat exchangers, and the like for power generating equipment and is excellent in corrosion resistance.

BACKGROUND ART

In recent years, in various technological fields, the global environment problem including global warming has become a matter of great concern. Under the situation, in a power-generating plant, it has become urgent to reduce the total emissions of carbon dioxide gas, and a newly built plant has been strongly required to have a facility capable of generating power with high efficiency. For example, in a thermal power generation boiler, a technique for increasing the temperature and pressure of steam to generate power with high efficiency has been adopted as an effective measure. The increase in temperature and pressure of steam leads to a rise in the tube wall temperature of superheater tube and reheater tube of boiler, so that the steel tube used for the boiler is required to have not only high-temperature strength but also resistance to high-temperature oxidation caused by steam. As a method for preventing steam oxidation of steel tube, various proposals have been made so far as described below.

(A) Technique of Performing Solution Heat Treatment after Formation of Worked Layer Patent Document 1 discloses an invention relating to a method for producing a surface fine-grained stainless steel tube, in which method, after an austenitic stainless steel tube has been subjected to solution treatment, cold working such as shot blasting, grinding, and polishing is performed on the tube surface, and then predetermined re-solution treatment is performed. Patent Document 2 discloses an invention relating to a method for thermo-mechanical treatment, in which an austenitic stainless steel tube is subjected to cold working at a working ratio of 20% or higher, and then is subjected to solid solution heat treatment at a temperature rise rate of 2.9° C./s or lower.

Patent Document 3 discloses an invention in which a fine-grained layer having a thickness of 30 μm or larger is formed on the inner surface of an austenitic iron alloy tube by using grains finer than the grain size number of No. 7, and thereafter cold working at a working ratio of 20% or higher is performed and recrystallization treatment is performed. Patent Document 4 discloses an invention in which cold working is performed so that the hardness at a position 20 μm deep from the inner surface of an austenitic stainless steel tube is Hv320 or higher, and solution treatment is performed.

(B) Technique of Increasing Contents of C and N to Form Fine-Grained Micro-Structure Even after Solution Heat Treatment Patent Document 5 discloses an invention relating to an austenitic stainless steel tube which has a fine-grained micro-structure having the grain size number of No. 7 or higher on the inner surface side of steel tube and whose fine-grained layer portion has a (C+N) content of 0.15% or more.

(C) Technique of Peening to Form Cold-Worked Layer

Patent Document 6 discloses an invention in which, after an austenitic stainless steel tube has been subjected to final heat treatment, peening is performed by blowing particles onto the inner surface of the steel tube. Patent Document 7 discloses an invention in which an austenitic stainless steel tube is subjected to peening treatment under predetermined conditions to form a worked layer having a thickness of 10 μm or larger. Patent Document 8 discloses an invention in which a tube body taken out of the existing boiler is subjected to chemical cleaning to descale the inner surface after heat treatment, and thereafter the inner surface of the tube body is subjected to shot blasting to form a cold-worked layer.

(D) Technique for Improving Adhesiveness of Scale

Patent Document 9 discloses an invention relating to a boiler steel tube excellent in steam oxidation resistance, which is produced by subjecting an austenitic stainless steel tube containing a rare earth metal to solution treatment, and has a peened layer formed by blowing particles onto the inner surface of the steel tube. Patent Document 10 discloses an invention relating to a steel tube which contains 9 to 28 mass % of Cr, and in which the maximum height of profile on the inner surface after cold working is 15 μm or larger, and further the difference in Vickers hardness between the inner surface layer and the wall thickness central portion of the tube is 100 or more.

(E) Technique for Subjecting Steel Tube to Cold Working at High Working Ratio

Patent Document 11 discloses an invention in which ultrasonic impact treatment is performed on the inner surface of a heat resistant ferritic steel tube or heat resistant austenitic steel tube containing 5 to 30 mass % of Cr. Patent Document 12 discloses an invention relating to an austenitic stainless steel tube which contains 16 to 20 wt % of Cr and whose inner surface is cold-worked, and more particularly relating to an austenitic stainless steel tube for boilers, in which the Cr concentration at a position near the inner surface of the steel tube is 14 wt % or higher, and the hardness at a position 100 μm deep from the inner surface of the steel tube is 1.5 times or more of the average hardness of base metal or Hv300 or higher. Patent Document 13 discloses an invention relating to a steel tube excellent in steam oxidation resistance, which has a worked layer having a high hardness of a steel tube containing 8 to 28 mass % of Cr.

(F) Technique for Improving Steam Oxidation Resistance of Heat Resistant Ferritic Steel Patent Document 14 discloses an invention relating to a method for working a heat resistant ferritic steel, in which method a steel containing 9.5 to 15% of Cr is normalized and tempered to make the crystal grains and the micro-structure uniform, and thereafter a shot-blasted layer is formed by blowing particles onto the surface.

LIST OF PRIOR ART DOCUMENTS

Patent Document

Patent Document 1: JP53-114722A
Patent Document 2: JP54-138814A
Patent Document 3: JP55-58329A
Patent Document 4: JP58-39733A
Patent Document 5: JP58-133352A
Patent Document 6: JP49-135822A
Patent Document 7: JP52-8930A
Patent Document 8: JP63-54598A Patent Document 9: JP6-322489A
Patent Document 10: JP2006-307313A
Patent Document 11: JP2004-132437A
Patent Document 12: WO 2008/023410
Patent Document 13: JP2009-68079A
Patent Document 14: JP2002-285236A

DISCLOSURE OF THE INVENTION

Problems to be Solved by the Invention

In the technique of item (A), solution heat treatment is performed at a high temperature to prevent the decrease in creep rupture strength and to suppress stress corrosion cracking. However, solution heat treatment, when performed, removes a strain introduced into the crystal grains on account of working, and causes recrystallization. Depending on the chemical composition of steel tube, the crystal grains generated due to solution treatment grow too large, and it becomes difficult to stably maintain the fine-grained layer on the surface of steel. As a result, the steam oxidation resistance improved by cold working treatment may be degraded.

In the technique of item (B), although the resistance to steam oxidation of tube can be somewhat improved, during the usage of boiler, the tube inner surface layer is sensitized extremely, so that stress corrosion cracking may occur as the operation stopped. Also, if the metal micro-structure of the whole steel tube is made too fine, the creep rupture strength decreases, and there arises a problem of failure to achieve the property of high-temperature strength, which is inherently important as a high-temperature member.

Thus, both of the techniques of items (A) and (B) involve many problems in practical use.

The technique of item (C) is one of effective techniques used as steam oxidation preventive measures in boilers for business in current use, that is, boilers in which the steam temperature is 566° C. (1050° F.), and has been applied to some of boiler steel tubes made of austenitic stainless steel. However, at a steam temperature of high-efficiency boiler, which is used in new plants, of for example, 621° C. (1150° F.), the tube wall temperature of superheater tube and reheater tube is 50 to 100° C. higher than that of the boiler in current use. There have been studied boilers having operation conditions such that the steam temperature is further increased to 650° C. or 700° C. In such a high temperature region, it is difficult to maintain the suppressive effect brought about by the technique of item (C) on steam oxidation for a long period of time.

According to the technique of item (D), although the protectability of scale can be extended and maintained, protectability of scale may not be sufficient considering the service time period of steel tube. In the technique of item (E), a steel tube can be subjected to cold working at a high working ratio. However, though being effective in forming initial scale, this technique still has problems to be solved in maintaining scale for a long period of time. Also, in the case of ultrasonic impact treatment, this technique has problems concerning introduction and operation costs of equipment.

In the technique of item (F), a protection film having high adhesiveness can be formed on a heat resistant ferritic steel, on which it is difficult to form a Cr oxide film, so that some improvement in steam oxidation resistance due to the protection film can be anticipated. However, this technique does not arrive at a fundamental solution considering long-term use. Also, this technique does not relate to a heat resistant austenitic steel.

The present invention has been made to solve the above-described problems with prior arts, and accordingly an objective thereof is to provide a steel tube having remarkably excellent steam oxidation resistance.

Means for Solving the Problems

The present inventors conducted studies earnestly to resolve the problems inherent in austenitic stainless steel tube for power-generating plants, and resultantly obtained the findings described below.

(a) When the surface of a material not subjected to working after solution heat treatment, that is, a material remaining solution heat-treated is brought into contact with high-temperature steam, thick steam oxidation scale called two-layer scale is formed on the surface. In contrast, it is generally said that when a material whose outer layer only has been subjected to working after solution heat treatment is brought into contact with high-temperature steam, extremely thin Cr oxide scale such as $Cr_2O_3$, which is low in the growth rate, is formed on the surface of steel.

(b) However, it was found that as a result of performing working on various steel tubes and observation of oxide scale after long-term steam oxidation test, even for a steel tube subjected to working after solution heat treatment, desired Cr oxide scale may not be maintained on the surface of the steel tube. In a location where Cr oxide scale is not maintained, breakaway oxidation occurs with this location being a starting point, and the steam oxidation resistance is deteriorated remarkably.

(c) For various steel tubes, the micro-structure in the vicinity of outer layer of the inner surface thereof was analyzed in detail, and resultantly, it was found that for only the steel tube having a micro-structure involving high-density dislocation in the vicinity of outer layer, Cr oxide scale is formed uniformly, and is also maintained for a long period of time.

(d) When dislocation is introduced further, the dislocation tends to migrate such that the elastic energy is decreased. Therefore, when the working rate is high, the micro-structure is divided into a portion where the dislocation density is high and a portion where the dislocation density is low (conversion of dislocation into cells). A high-density dislocation structure is formed by performing working further thereon and by repeating the introduction and the recovery of dislocation.

(e) When the steel tube is held at a temperature of 550° C. or higher, which is the operation temperature of power-generating plant, especially at a temperature of 600° C. or higher, the high-density dislocation structure disappears, and changes to fine crystal grains having no internal strain, that is, to a so-called recrystallization structure. Since the recrystallization structure consists of fine grains of submicron to about several micrometers, the Cr flux that is necessary for stably maintaining uniformly formed Cr oxide scale can be assured through the grain boundary diffusion of fine recrystallized grains. On the other hand, even if working is performed on the surface, in the case where the dislocation density is low, a recovery structure, in which only the rearrangement of dislocation occurs at the operation temperature, is formed. In this case, the structure grain size at the time of solution treatment of steel tube is maintained, so that the number of grain boundaries is small, and the grain boundary diffusion of Cr is insufficient. As a result, the Cr flux becomes insufficient, the Cr oxide scale cannot be maintained, and breakaway oxidation occurs. That is, in order to maintain Cr oxides, which are effective for steam oxidation resistance, for a long period of time, it is necessary to uniformly form a metal micro-structure in which dislocations exist at a high density, which is to be called a "strongly worked layer" or "super-strongly worked layer", in the outer layer of steel tube.

(f) Since the driving force of recrystallization is determined by the dislocation density, the relationship between dislocation density and recrystallization and the steam oxidation behavior were studied in detail. As a result, it was found that in judging the metal micro-structure for maintaining Cr oxides for a long period of time, it is most efficient to use the average dislocation density (the sum total of dislocation lengths contained per unit volume), which is obtained by XRD measurement using a Co tube, as an indicator.

(g) Especially in the case where the steel tube is used in a high-temperature environment in which the temperature reaches about 700° C., it may be necessary to supply Cr from the deep portion of base metal beyond the recrystallization structure of the near-surface portion. In this case as well, in order to assure the Cr flux, it is preferable that the crystal grains of metal micro-structure, which has not been subjected to working, be made fine in advance.

The present invention was made based on the above-described findings, and includes austenitic stainless steel tubes described in the following items (1) to (3).

(1) An austenitic stainless steel tube containing, by mass percent, 14 to 28% of Cr and 6 to 30% of Ni, wherein the steel tube has a metal micro-structure, in which an average dislocation density, which is determined by XRD measurement using a Co tube, is $3.0 \times 10^{14}/m^2$ or higher, on the inner surface of the steel tube.

(2) The austenitic stainless steel tube according to (1), wherein the grain size of the steel tube is 50 μm or smaller.

(3) The austenitic stainless steel tube according to (1) or (2), wherein the steel tube is used as a member for a power-generating plant.

Advantageous Effects of the Invention

According to the present invention, even in the case where a steel tube is used in a high-temperature environment in which the temperature reaches about 750° C., scale that is excellent in protectability against steam oxidation can be formed uniformly on the surface of the steel tube, and further, by stably maintaining the protective scale, the occurrence of breakaway oxidation can be prevented. Therefore, the austenitic stainless steel tube in accordance with the present invention is suitable as a steel tube used in power-generating plants having an operation temperature of 550° C. or higher, especially 600° C. or higher.

Mode for Carrying Out the Invention

In order to obtain a steel tube in which scale excellent in protectability is formed uniformly on the inner surface of the tube and is maintained for a long period of time, it is necessary to form high-density dislocations on the inner surface of the steel tube. Since the dislocation is introduced into the inner grains, strong working is performed by controlling the working conditions. In the steel tube with high-density dislocations formed on the surface, the high-density dislocation structure is recrystallized during the operation of power-generating plant, thereby forming fine structure, and many grain boundary diffusion paths are formed on the surface, thereby assuring Cr flux. As a result, the Cr-based oxide scale excellent in protectability is maintained for a long period of time.

Usually, the dislocation density of metal micro-structure after solution heat treatment is about $10^{12}/m^2$, whereas the dislocation density of metal micro-structure in the near-surface portion is raised by performing working. The steel tube of the present invention has a metal micro-structure, in which the average dislocation density determined by XRD measurement using a Co tube is $3.0 \times 10^{14}/m^2$ or higher, on the inner surface. In particular, in order to maintain the steam oxidation resistance in a high-temperature environment for a long period of time, it is preferable that the steel tube have a metal micro-structure having the average dislocation density of $3.5 \times 10^{14}/m^2$ or higher, and it is further preferable that the steel tube have a metal micro-structure having the average dislocation density of $4.0 \times 10^{14}/m^2$ or higher. Although a higher average dislocation density is effective, the hardness rises with an increase in dislocation density. If the hardness is too high, the starting point of a crack is generated, and the mechanical properties of material may be degraded. Therefore, the upper limit of the average dislocation density determined by XRD measurement using a Co tube is $1.0 \times 10^{16}/m^2$.

The reason why the steel tube of the present invention is defined as described above will be explained below.

First, the method for measuring dislocation density by XRD measurement using a Co tube in the present invention is explained.

The θ-2θ measurement is made from the specimen surface. From the obtained X-ray diffraction data, the angle and half-width of diffraction peak and the half-width of diffraction strength are determined by the Lorentz function approximation of {111}, {200}, {220} and {311} planes, and the dislocation density is calculated from the Modified Williams-Hall equation and the Modified Warren-Averbach equation. At this time, as anisotropic elastic constants necessary for contrast factor, the already-known values ($C_{11}$=1.98, $C_{12}$=1.25, and $C_{44}$=1.22) of Fe-18% Cr-14% Ni steel are used, and the average contrast factor ($C_{h00}$=0.345) is calculated. The Burgers vector at this time is 0.249 nm from the lattice constant.

At the mass absorption coefficient and density 7.94 g/cm$^3$ of Fe-18% Cr-9% Ni-3% Cu steel, the X-rays of a Co tube intrude into a position of about 11 inn at maximum from the surface, so that the average dislocation density down to about 11 μm in depth from the surface can be obtained.

When working is performed from the outer layer, the dislocation density becomes the highest on the surface. Since the X-rays of a Co tube intrude into a position of about 11 μm at maximum from the surface of steel tube as described above, the average dislocation density determined by the Co tube is the mean value of dislocation densities down to 11 μm from the surface of steel tube. Since the dislocation density decreases in a generally gradual manner with the depth, on the assumption that the dislocation density decreases linearly, if the average dislocation density determined by XRD measurement using a Co tube is $3.0 \times 10^{14}/m^2$ or higher, the dislocation density in the region down to a depth of about 5 μm from the surface is $3.0 \times 10^{14}/m^2$ or higher. If the region having a high dislocation density, that is, the strongly worked layer is formed down to a depth of about 5 μm from the inner surface of steel tube as described above, the Cr oxide scale is formed uniformly, and the steam oxidation resistance can be achieved sufficiently.

In the case where the usage environment of steel tube reaches a high-temperature environment exceeding 700° C., it is important to stably maintain the Cr oxide scale. In order to stably maintain the Cr oxide scale, it is necessary to make the crystal grain size of base metal in a proper range to assure Cr flux from the base metal. For this reason, it is preferable that the grain size of base metal be 50 μm or smaller on the average. With decreasing grain size, the number of diffusion paths through the grain boundary increases. Therefore, the crystal grain size of base metal is more preferably 30 μm or smaller on the average. However, if the crystal grain size is decreased excessively, the creep properties of steel tube decrease. For this reason, the crystal grain size is preferably 10 μm or larger on the average. Since the crystal grain size of base metal is approximately uniform in a region not subjected to working, the grain size should be measured in the central portion of the wall thickness of steel tube. The crystal grain size can be measured by using an optical microscope or the like.

The tube that is the object of the present invention is a heat resistant austenitic steel tube or the like. Since the scale formed on the inner surface of tube must consist mainly of Cr oxides, the material of tube is made an austenitic stainless steel containing 14 to 28 mass % of Cr and 6 to 30 mass % of Ni.

As the examples of materials of tube that is the object of the present invention, austenitic stainless steels such as SUS304, SUS309, SUS310, SUS316, SUS321, and SUS347 specified in JIS Standard, and steels equivalent to these steels can be cited. An example of the chemical composition of the applicable steel type is as described below. In the following description, the symbol "%" concerning the content of each element means "percent by mass".

An austenitic stainless steel consisting of C: 0.2% or less, Si: 2.0% or less, Mn: 0.1 to 3.0%, Cr: 14 to 28%, and Ni: 6 to 30%, the balance being Fe and impurities. In lieu of a part of Fe, this steel may contain one or more types of elements belonging to any group of the first to fourth groups described below.

First group: Mo: 5% or less, W: 10% or less, Cu: 5% or less, and Ta: 5% or less
Second group: N: 0.3% or less
Third group: V: 1.0% or less, Nb: 1.5% or less, and Ti: 0.5% or less
Fourth group: Ca: 0.02% or less, Mg: 0.02% or less, Al: 0.3% or less, Zr: 0.5% or less, B: 0.02% or less, and REM: 0.1% or less The "impurities" in this description mean components that mixedly enter on account of various factors in the production process, including raw materials such as ore or scrap, when a stainless steel is produced on an industrial scale, the components being allowed to exist in the range such that they do not exert an adverse influence on the present invention.

The advantageous effects of each component of the steel types and the reasons for restricting the content of each component are described below.

C: 0.2% or less

C (carbon) is an element effective in assuring the strength and the creep strength. However, if the C content exceeds 0.2%, undissolved carbides remain in a solution treated state, and in some cases, C does not contribute to the improvement in high-temperature strength. Also, C may exert an adverse influence on the mechanical properties such as toughness. Therefore, the C content is preferably 0.2% or less. From the viewpoint of deterioration in hot workability and toughness, the C content is more preferably 0.12% or less. In order to achieve the above-described effect, 0.01% or more of C is preferably contained.

Si: 2.0% or less

Si (silicon) is an element used as a deoxidizer, and moreover is an element effective in improving the steam oxidation resistance. However, if the Si content becomes high, the weldability or hot workability is deteriorated. Therefore, the Si content is preferably 2.0% or less, and is more preferably 0.8% or less. The above-described effects become remarkable if 0.1% or more of Si is contained.

Mn: 0.1 to 3.0%

Mn (manganese) is, like Si, effective as a deoxidizer. Also, Mn has an action for suppressing the deterioration in hot workability caused by S contained as an impurity. In order to achieve the deoxidizing effect and to improve the hot workability, it is preferable that 0.1% or more of Mn be contained. However, since the excessive containing of Mn leads to embrittlement, the upper limit of Mn content is preferably 3.0%, and is more preferably 2.0%.

Cr: 14 to 28%

Cr (chromium) is an element effective in contributing to high-temperature strength, and improving the oxidation resistance and corrosion resistance by the formation of scale consisting mainly of Cr oxides on the inner surface of steel tube. In order to achieve these effects, 14% or more of Cr must be contained. However, if Cr is contained excessively, the toughness and hot workability may be deteriorated. Therefore, the upper limit of Cr content is 28%. The preferable lower limit of Cr content is 15%, and the preferable upper limit thereof is 26%. Also, in the case where the acid resistance is improved, the lower limit of Cr content is more preferably 16%.

Ni: 6 to 30%

Ni (nickel) is an element necessary for stabilizing the austenitic structure and improving the creep strength. Therefore, 6% or more of Ni must be contained. However, even if Ni is contained in large amounts, the effects are saturated, and merely the cost increases. Therefore, the upper limit of Ni content is 30%. The preferable lower limit thereof is 7%. The upper limit thereof is preferably 25%, more preferably 21%.

First Group:

Mo: 5% or less
W: 10% or less
Cu: 5% or less
Ta: 5% or less

Mo (molybdenum), W (tungsten), Cu (copper), and Ta (tantalum) may be contained because they enhance the high-temperature strength of steel. However, if these elements are contained in large amounts, the weldability and workability are degraded. If these elements are contained, the upper limits of Mo content, Cu content, and Ta content are 5%, respectively, and the upper limit of W content is 10%. The above-described effects become remarkable if 0.1% or more of at least any one type of these elements is contained.

Second Group:

N: 0.3% or less

N (nitrogen) contributes to solid-solution strengthening of steel, and has an effect of strengthening a steel by precipitation strengthening action in combination with other elements. However, if the N content is excessive, the ductility and weldability may be deteriorated. Therefore, if N is contained, the content thereof is 0.3% or less. In the case where it is desired to achieve the above-described effects, 0.005% or more of N should be contained.

Third Group:

V: 1.0% or less
Nb: 1.5% or less
Ti: 0.5% or less

Any of V (vanadium), Nb (niobium) and Ti (titanium) is an element that combines with carbon and nitrogen to form carbo-nitrides, thereby contributing to precipitation strengthening, so that these elements can be contained as necessary. However, if the contents of these elements are excessive, the workability of steel may be degraded. Therefore, it is preferable that the V content is 1.0% or less, the Nb content is 1.5% or less, and the Ti content is 0.5% or less. In the case where it is desired to achieve the above-described effect, 0.01% or more of one or more types selected from these elements is preferably contained.

Fourth Group:
Ca: 0.02% or less
Mg: 0.02% or less
Al: 0.3% or less
Zr: 0.5% or less
B: 0.02% or less
REM: 0.1% or less Any of Ca (calcium), Mg (magnesium), Al (aluminum), Zr (zirconium), B (boron) and REM (rare-earth metal, La, Ce, Y, Pr, Nd, etc.) has an effect of improving the strength, workability, and steam oxidation resistance, so that these elements can be contained as necessary. However, if the contents of these elements are excessive, the workability or weldability may be degraded. Therefore, it is preferable that the Ca content is 0.02% or less, the Mg content is 0.02% or less, the Al content is 0.3% or less, the Zr content is 0.5% or less, the B content is 0.02% or less, and the REM content is 0.1% or less, and also it is preferable that the total content of these elements is 0.8% or less. In the case where it is desired to achieve the above-described effects, 0.0001% or more of one or more types selected from these elements is preferably contained.

REM is the general term of a total of 17 elements consisting of Sc (scandium), Y (yttrium), and lanthanoids, and the REM content means the total content of these 17 elements.

The method for producing the steel tube according to the present invention is not especially limited, and a usual melting process, casting process, and tube-making process can be employed. That is, for example, a steel having the above-described chemical composition is melted and cast, thereafter being turned to a material tube by various hot rolling process (extrusion tube-making process, drawing tube-making process, Mannesmann tube-making process, etc.), and this material tube is subjected to softening heat treatment as necessary. The hot material tube is turned to a tube having a desired shape by one of various cold working processes such as a cold rolling process or a cold drawing process, and thereafter a worked layer is formed on the inner surface of steel tube. Also, after the tube has been made by cold working, to homogenize the crystal grains, a strongly worked layer may be formed on the inner surface of steel tube after the tube has been subjected to solution heat treatment.

The method for forming the strongly worked layer on the inner surface of steel tube is not especially limited as far as controlled blows or impacts are given to the inner surface of steel tube. For example, publicly known processes such as shot peening, shot blast, shot working, sandblast, sand working, air blast, water jet, ultrasonic waves can be employed by controlling the energy of blow or impact. The formation of strongly worked layer can be realized by controlling the pressure of compressed air at the time of injection, the injection amount of particles, and the shape of injection nozzle.

The material quality, shape, size, and the like of blowing particles are not limited. As the material quality, for example, steel, cast steel, stainless steel, glass, quartz sand, alumina, amorphous alloy, zirconia, or the like can be used. Also, as the shape, for example, spherical shape, cut wire, round cut wire, grid, or the like can be used. Concerning the size, the optimum size should be adopted to enhance the blow or impact energy because the size exerts an influence on the energy. The particles may be blown by using compressed air, centrifugal force created by an impeller, high-pressure water, ultrasonic waves, or the like. When the particles are not used, the metal-made member may be directly struck with ultrasonic waves or the like.

In the case of shot working, shot working only needs be performed by selecting, as appropriate, the shot conditions and nozzle shape such that the inner surface undergoes working stronger than before. The shot conditions are not especially limited but, for example, the injection speed of shot particles is preferably 50 m/s or higher. Also, with a decrease in shot particle size, the injection speed can be increased, and the region near the inner surface can undergo great working. In particular, if particles having a grain size of 0.5 mm or smaller on the average are blown under control, the structure of higher-density dislocation can be formed uniformly over the overall length in the longitudinal direction of the inner surface of steel tube.

By using these methods, a metal micro-structure satisfying the above-described conditions only needs to be formed on the inner surface of steel tube by controlling various conditions.

EXAMPLE 1

Steel tubes each having the chemical composition given in Table 1 were prepared under various conditions, and the crystal grain size of the steel tube itself and the average dislocation density determined by XRD using a Co tube on the inner surface side of the steel tube were measured by the methods described below. Further, a steam oxidation test was conducted.

TABLE 1

| Steel No. | Chemical composition (in mass %, balance: Fe and impurities) | | | | | | |
|---|---|---|---|---|---|---|---|
| | C | Si | Mn | Cr | Ni | Nb | |
| 1 | 0.09 | 0.4 | 1.5 | 18.3 | 11.4 | 0.9 | — |
| 2 | 0.08 | 0.2 | 0.8 | 18.6 | 9.0 | 0.5 | Cu: 2.9, N: 0.1 |
| 3 | 0.07 | 0.4 | 1.2 | 25.0 | 20.0 | 0.5 | N: 0.24 |
| 4 | 0.02 | 0.3 | 1.5 | 18.5 | 12.8 | — | V: 0.3, Mo: 2.1, B: 0.002, N: 0.25 |
| 5 | 0.07 | 0.3 | 1.2 | 13.6 * | 9.5 | 0.7 | Mo: 0.1 |
| 6 | 0.04 | 0.2 | 1.1 | 19.1 | 9.2 | — | — |
| 7 | 0.05 | 0.5 | 0.2 | 19.8 | 11.6 | — | W: 1.5, Ca: 0.002 |
| 8 | 0.07 | 1.2 | 1.5 | 18.1 | 8.7 | — | Ti: 0.12, Mg: 0.003, Nd: 0.021 |
| 9 | 0.04 | 0.5 | 0.6 | 18.3 | 9.5 | — | Al: 0.05, B: 0.002, Zr: 0.02 |
| 10 | 0.07 | 0.1 | 1.0 | 20.5 | 25.6 | — | Ta: 0.56, La: 0.008, Ce: 0.024 |

* indicates that conditions do not satisfy those defined by the present invention.

For steel Nos. 1 to 10, a 180-kg ingot was prepared by vacuum melting in a laboratory, and a material tube (outside diameter: 110 mm, wall thickness: 12 mm) was produced by hot forging and hot extrusion. For steel No. 1, surface scale was removed after hot extrusion, and thereafter solution heat treatment was performed. For steel Nos. 2 to 10, a steel tube (outside diameter: 50.8 mm, wall thickness: 8 mm) was produced by cold rolling, and thereafter solution heat treatment was performed. For steel No. 2, steel tubes having four kinds of crystal grain size were prepared by controlling the temperature and time of solution heat treatment. On the inner surfaces of these steel tubes, surface treatment was performed under the conditions given in Table 2 to prepare specimens. In the case of shot working, the depth of the strongly worked layer was regulated by changing the injection pressure, injection amount, injection angle, nozzle shape, and the like.

of breakaway oxidation occurrence was determined, and the value divided by the measurement length of 8 mm was determined as a breakaway oxidation coverage (%). This value is given in Table 2. The test specimen with a breakaway oxidation coverage of 15% or less passed an inspection.

TABLE 2

| Test No. | Steel No. | Conditions of the solution heat treatment | | Surface treatment | Shot working condition Injection speed of particles (m/s) | Dislocation density ($m^{-2}$) | Average grain size of base metal[#1] (μm) | Abnormal oxidation coverage at 650° C.[#2] (%) | Abnormal oxidation coverage at 750° C.[#2] (%) |
|---|---|---|---|---|---|---|---|---|---|
| | | Temperature (° C.) | Time (min) | | | | | | |
| 1 | 1 | 1220 | 10 | Shot peening | 70 | $4.1 \times 10^{14}$ | 27.5 | 2.9 | 4.8 |
| 2 | 1 | 1220 | 10 | Shot peening | 60 | $3.6 \times 10^{14}$ | 27.5 | 3.9 | 7.4 |
| 3 | 2 | 1160 | 10 | Shot peening | 80 | $4.6 \times 10^{14}$ | 17.3 | 1.5 | 3.0 |
| 4 | 2 | 1160 | 10 | Shot peening | 40 | $2.6 \times 10^{14}$ * | 17.3 | 19.7 | 62.5 |
| 5 | 2 | 1250 | 10 | Shot peening | 100 | $9.1 \times 10^{14}$ | 44.0 | 0.8 | 2.4 |
| 6 | 2 | 1240 | 20 | Shot peening | 80 | $5.6 \times 10^{14}$ | 54.2 ** | 1.5 | 7.8 |
| 7 | 2 | 1250 | 30 | Shot peening | 80 | $4.0 \times 10^{14}$ | 94.1 ** | 2.2 | 8.9 |
| 8 | 3 | 1220 | 20 | Alumina blast | 50 | $3.1 \times 10^{14}$ | 25.6 | 2.6 | 12.8 |
| 9 | 3 | 1220 | 20 | Shot peening | 100 | $7.5 \times 10^{14}$ | 25.6 | 0.6 | 1.5 |
| 10 | 4 | 1160 | 10 | Ultrasonic wave | — | $3.4 \times 10^{14}$ | 20.3 | 5.8 | 13.2 |
| 11 | 4 | 1160 | 10 | Shot peening | 80 | $4.7 \times 10^{14}$ | 20.3 | 0.4 | 2.2 |
| 12 | 5 * | 1160 | 10 | Shot peening | 80 | $4.5 \times 10^{14}$ | 21.2 | 100 | 100 |
| 13 | 6 | 1180 | 5 | Shot peening | 80 | $5.3 \times 10^{14}$ | 23.1 | 0.6 | 1.6 |
| 14 | 7 | 1220 | 10 | Shot peening | 80 | $6.7 \times 10^{14}$ | 18.7 | 1.5 | 1.9 |
| 15 | 8 | 1220 | 10 | Shot peening | 80 | $6.2 \times 10^{14}$ | 17.7 | 1.0 | 1.5 |
| 16 | 9 | 1200 | 10 | Shot peening | 80 | $5.7 \times 10^{14}$ | 22.5 | 0.9 | 1.4 |
| 17 | 10 | 1230 | 8 | Shot peening | 80 | $5.9 \times 10^{14}$ | 24.5 | 0.8 | 1.5 |

* indicates that conditions do not satisfy those defined by claim 1 of the present invention.
** indicates that conditions do not satisfy those defined by claim 2 of the present invention.
[#1] indicates a crystal grain size of steel pipe.
[#2] indicates a result of steam oxidation test at each temperatures for 1000 hours.

[Crystal Grain Size of Steel Tube]

A small-piece test specimen was cut out of each specimen, a central portion of steel tube wall thickness of the surface corresponding to the steel tube cross section of each specimen was observed by using an optical micrometer in four visual fields, and the crystal grain size of the steel tube itself (base metal) was measured. The mean value of the measured crystal grain sizes is given in Table 2.

[Dislocation Density]

A small-piece test specimen was cut out of each specimen, and XRD measurement using a Co tube was made from the inner surface side of each test specimen. Based on the obtained diffraction strength, the average dislocation density was determined. The determined value is given in Table 2.

[Steam Oxidation Test]

A strip-shaped test specimen with thickness of 2 mm, width of 10 mm, and length of 25 mm was cut out of each specimen so that the tube inner surface forms a part of test specimen surface. This test specimen was held in a form of being hung down from a jig, being inserted in a horizontal tube heating furnace, and an oxidation test was conducted in a steam atmosphere of dissolved oxygen amount of 100 ppb at temperatures of 650° C. and 750° C. for 1000 hours. The test specimen taken out after being furnace-cooled was embedded in a resin, and the cross section thereof was cut and mirror-polished. Thereafter, the cross section of oxide scale formed on the inner surface of steel tube was observed under an optical microscope over the overall length of 8 mm of the test specimen width of 10 mm excluding 1 mm at each end. A location where the scale thickness exceeded 10 μm was defined as breakaway oxidation, the sum total of lengths Referring to Table 2, for the steels of test Nos. 1 to 3, 5 to 11, and 13 to 17, since the requirements of the invention according to claim 1 was satisfied, those steels had the breakaway oxidation film with the coverage of 15% or less in the steam oxidation test at both temperatures of 650° C. and 750° C. and showed the property of excellent steam oxidation resistance. In these test numbers, the steels of test Nos. 6 and 7, in which the base metal crystal grain size was 50 μm or larger, falling outside the defined range of the invention according to claim 2, had the breakaway oxidation film with the coverage of relatively high as compared with that of test No. 3 that used the same steel No. 2 and satisfied the requirement of the invention according to claim 2, although the coverage is within the acceptable range. On the other hand, the steel of test No. 4 in which the dislocation density was $3.0 \times 10^{14}/m^2$ or lower, falling outside the defined range of the present invention, had the breakaway oxidation film with the coverage of more than 15%, which is unacceptable. Also, the steel of test No. 12 which used steel No. 5 in which the Cr content was lower than the defined lower limit, had the breakaway oxidation film with the coverage of 100%, which is unacceptable, in the steam oxidation test at both temperatures of 650° C. and 750° C.

INDUSTRIAL APPLICABILITY

According to the present invention, even in the case where a steel tube is used in a high-temperature environment in which the temperature reaches about 750° C., scale that is excellent in protectability against steam oxidation can be formed uniformly on the surface of the steel tube, and further, by stably maintaining the protective scale, the occurrence of breakaway oxidation can be prevented. Therefore, the austenitic stainless steel tube according to the present invention is suitable as a steel tube used in power-generating plants having an operation temperature of 550° C. or higher, especially 600° C. or higher.

What is claimed is:

1. An austenitic stainless steel tube containing, by mass percent, 14 to 28% of Cr and 6 to 30% of Ni, wherein the steel tube has a metal micro-structure, in which an average dislocation density, which is determined by XRD measurement using a Co tube, is $3.0 \times 10^{14}/m^2$ or higher, on the inner surface of the steel tube.

2. The austenitic stainless steel tube according to claim 1, wherein the grain size of the steel tube is 50 μm or smaller.

3. The austenitic stainless steel tube according to claim 1, wherein the steel tube is used as a member for a power-generating plant.

* * * * *